United States Patent
Zhu et al.

(10) Patent No.: US 10,743,619 B2
(45) Date of Patent: Aug. 18, 2020

(54) SHOE CLOSURE DEVICE

(71) Applicant: Nano and Advanced Materials Institute Limited, Hong Kong (HK)

(72) Inventors: Yong Zhu, Hong Kong (HK); Yam Chong, Hong Kong (HK); Chenmin Liu, Hong Kong (HK); Shengbo Lu, Hong Kong (HK)

(73) Assignee: Nano and Advanced Materials Institute Limited, Hong Kong (HK)

(*) Notice: Subject to any disclaimer, the term of this patent is extended or adjusted under 35 U.S.C. 154(b) by 0 days.

(21) Appl. No.: 16/578,395

(22) Filed: Sep. 22, 2019

(65) Prior Publication Data

US 2020/0100569 A1 Apr. 2, 2020

Related U.S. Application Data

(60) Provisional application No. 62/919,277, filed on Mar. 6, 2019, provisional application No. 62/766,041, filed on Sep. 28, 2018.

(51) Int. Cl.
| | |
|---|---|
| *A43C 1/06* | (2006.01) |
| *A43C 11/00* | (2006.01) |
| *F16B 1/00* | (2006.01) |

(52) U.S. Cl.
CPC ............... *A43C 1/06* (2013.01); *A43C 11/00* (2013.01); *F16B 1/0014* (2013.01)

(58) Field of Classification Search
CPC ......... A43C 1/06; A43C 11/00; F16B 1/0014; A43B 3/0005
See application file for complete search history.

(56) References Cited

U.S. PATENT DOCUMENTS

| | | | | |
|---|---|---|---|---|
| 6,598,322 | B2* | 7/2003 | Jacques | A43B 3/0005 36/127 |
| 7,188,439 | B2* | 3/2007 | DiBenedetto | A43B 1/0054 36/132 |
| 9,730,494 | B1* | 8/2017 | Feinstein | A43C 11/1493 |
| 10,455,900 | B2* | 10/2019 | Feinstein | A61F 5/0111 |
| 2014/0306473 | A1* | 10/2014 | Koehler | B25J 9/1085 294/192 |
| 2016/0309834 | A1* | 10/2016 | Zwick | A43B 1/0054 |
| 2017/0318908 | A1* | 11/2017 | Wyatt | A43C 11/008 |
| 2018/0066636 | A1* | 3/2018 | Khoshkava | G06F 3/016 |

* cited by examiner

*Primary Examiner* — Robert Sandy
*Assistant Examiner* — Rowland Do
(74) *Attorney, Agent, or Firm* — Idea Intellectual Limited; Margaret A. Burke; Sam T. Yip

(57) ABSTRACT

A shoe closure device comprising: a housing including a top cover portion and a bottom cover portion; a shape memory shoe fastener; a first electrically-powered heater positioned above the shape-memory shoe fastener; a second electrically-powered heater positioned beneath the shape memory shoe fastener; a rechargeable battery positioned within the housing and electrically communicating with each of the first and second electrically-powered heaters; a controller electrically communicating with the rechargeable battery and positioned within the housing, the controller including a microprocessor, a battery charging control circuit, and a wireless charging receiver, the controller configured to heat the shape memory shoe fastener to return each of the shape memory polymer strips to the shape-recovered configuration to close a shoe; an actuator communicating with the controller to actuate the controller to heat the shape memory shoe fastener.

10 Claims, 17 Drawing Sheets

SHOE CLOSURE DEVICE

CROSS-REFERENCE TO RELATED APPLICATIONS

The present application claims priorities from U.S. provisional patent application Ser. No. 62/766,041 filed Sep. 28, 2018 and the U.S. provisional patent application Ser. No. 62/919,277 filed Mar. 6, 2019; the disclosures of which are incorporated herein by reference in their entirety.

FIELD OF THE INVENTION

The present invention provides a shoe closure device to perform auto lacing function in the footwear by the virtue of the intrinsic shape fixing and shape recovery properties of shape memory polymers (SMPs).

BACKGROUND

Tying the shoelaces may be inconvenient. The traditional way of tying the shoelaces is mostly manual. However, it is inconvenient for people who cannot bend down and kneel down to tie shoes, and the shoelaces are often loose when walking and need to be re-tied. Therefore, it either takes extra time to tie the shoes or accidents might happen due to loose shoelaces. Thus, finding a way to automatically lace the shoes is desirable.

In the past decade, various methods tightening an article of footwear have been proposed.

US20080086911A1 discloses a weight-activated tying shoe wherein user who, upon sliding his foot inside the shoe, will depress a movable inner sole. This activates a side mechanism composed of a winch with a cable system used to close the tongue of the shoe towards the user's foot, thus lacing the shoe.

U.S. Pat. No. 5,117,567A discloses a shoe provided with a central closing device, especially a sport, leisure or rehabilitation shoe, with an upper formed of flexible upper materials, and with an instep shield which covers the instep. The instep shield is designed so that it can be fastened to the side parts of the shoe on both sides of the shoe upper, in a manner making is possible to tighten the instep shield and the side parts of the shoe upper over the entire closing area in a simple way and with as uniform a closing or tightening force as possible to guarantee as uniform a pressure distribution as possible along the entire throat area of the shoe.

U.S. Pat. No. 9,204,690B1 discloses a device for automatically tying and untying shoelaces. The device includes a gear box for positioning with the tongue of a shoe, the gear box having pulleys around which laces can be wound. A motor is included in the gear box for selectively turning the pulleys to wind and unwind the laces. Controls accessible via the tongue of a shoe are provided for activating the motor. The laces are included for winding through lace holes of the shoe and around the pulleys.

WO2016191123A1 teaches an article of footwear can include provisions for improving the operation and use of various systems associated with the article. The automated tensioning system may tighten and loosen the article of footwear through the operation of a motor. The automated tensioning system may also be able to store and recall a preset tension level.

However, the major shortcomings of these conventional shoe closure devices include large shoe size, noisy motor sounds, and poor maintainability, etc. In view of the disadvantages of the existing automatically shoe closure device, it is necessary to find a material, device or a combination thereof which is lighter, cheaper, and easy to handle. The objective of this invention is to provide a cost-effective and environmentally-friendly footwear system to realize an auto lacing function in the footwear by the virtue of the intrinsic shape fixing and shape recovery properties of shape memory polymers.

SUMMARY OF THE INVENTION

In accordance with the present invention, there is provided a shoe closure device comprising: a housing including a top cover portion and a bottom cover portion; a shape memory shoe fastener; a first electrically-powered heater positioned above the shape-memory shoe fastener; a second electrically-powered heater positioned beneath the shape memory shoe fastener; a rechargeable battery positioned within the housing and electrically communicating with each of the first and second electrically-powered heaters; a controller electrically communicating with the rechargeable battery and positioned within the housing, the controller including a microprocessor, a battery charging control circuit, and a wireless charging receiver, the controller configured to heat the shape memory shoe fastener to return each of the shape memory polymer strips to the shape-recovered configuration to close a shoe; an actuator communicating with the controller to actuate the controller to heat the shape memory shoe fastener.

The shape memory shoe fastener comprises a plurality of shape memory polymer strips, at least a portion of each shape memory polymer strip positioned within the housing and a least a portion of each shape memory polymer strip extending from the housing. The extending portion is configured to engage one or more of a shoelace, a shoe tongue, or a shoe quarter. Each of the shape memory polymer strips has an elongated configuration corresponding to a loosened, open shoe state, and a shape-recovered configuration corresponding to a tightened, closed-shoe state.

In a first embodiment of the first aspect of the present invention, there is provided a shoe closure device where the shape memory shoe fastener includes a plurality of through holes configured to receive a shoelace.

In a second embodiment of the first aspect of the present invention, there is provided a shoe closure device where the housing further includes one or more cooling holes.

In a third embodiment of the first aspect of the present invention, there is provided a shoe closure device where each of the first and second electrically-powered heaters is a resistive heating element.

In a fourth embodiment of the first aspect of the present invention, there is provided a shoe closure device where the shape memory polymer strips are selected from one or more of shape memory polyurethane, polyester, polystylene, polynorbornene, block copolymer of polyethylene terephthalate (PET) and polyethyleneoxide (PEO), block copolymers containing polystyrene and poly(1,4-butadiene).

In a fifth embodiment of the first aspect of the present invention, there is provided a shoe closure device further comprising one or more aligning elements positioned adjacent to the wireless charging receiver.

In a sixth embodiment of the first aspect of the present invention, there is provided a shoe closure device where the shape memory polymer strips have either a melting point or a glass transition temperature in a range between approximately 20 degrees C. to approximately 80 degrees C.

In a seventh embodiment of the first aspect of the present invention, there is provided a shoe closure device further comprising a thermal sensor communicating with the controller for providing temperature feedback to the controller.

In an eighth embodiment of the first aspect of the present invention, there is provided a shoe closure device where the controller further comprises a voltage stepping integrated circuit.

In a ninth embodiment of the first aspect of the present invention, there is provided a shoe closure device further comprising a separator positioned between the first electrically-controlled heater and the controller.

BRIEF DESCRIPTION OF THE DRAWINGS

Embodiments of the present invention are described in more detail hereinafter with reference to the drawings, in which.

DEFINITIONS

Figure 1:
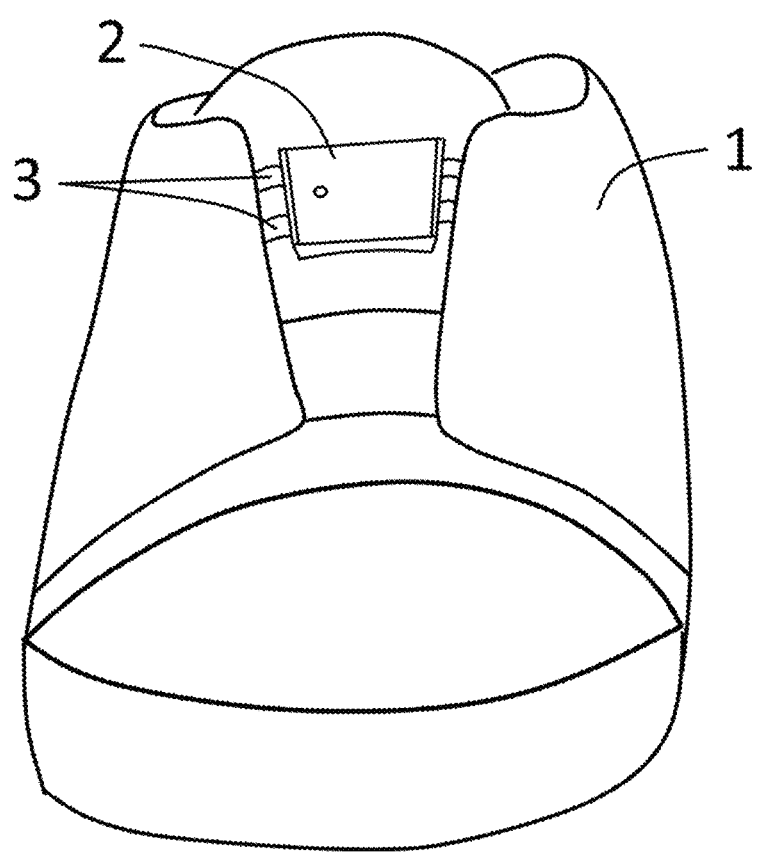
FIG. 1 depicts a perspective of a shoe equipped with the shoe closure device.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The terms "shape memory polymer (SMP)" or "shape-memory polymeric component" used herein, or sometimes they are used interchangeably, refer to the stimuli-responsive materials that can be deformed and subsequently fixed into a temporary shape. Upon receiving an external stimulus (e.g. heat, solvent, electrical current, light, magnetic field, or change of pH a thermal stimulus), the material will return to its permanent configuration, and then relax to the original, stress-free condition under specific condition. That is, SMPs give materials great potential for application in sensors, actuators, smart devices, and media recorders. Examples of shape memory polymers used in the present invention include, but are not limited to polyester-based or polyether-based shape memory polyurethane, where polyester-based SMP includes but is not limited to polycaprolactone-based SMP.

The terms "shoe" used herein, refer to a foot covering. Examples of shoes used in the present invention include, but are not limited to shoes, sneakers, trainers, tennis shoes, or slippers. Any foot covering that can be opened and closed by a shape memory polymer is considered to be within the scope of the term "shoe" as used in the present specification and claim.

DETAILED DESCRIPTION

In the following description, the present shoe closure devices are set forth as preferred examples. It will be apparent to those skilled in the art that modifications, including additions and/or substitutions may be made without departing from the scope and the spirit of the invention. Specific details may be omitted so as not to obscure the invention; however, the disclosure is written to enable one skilled in the art to practice the teachings herein without undue experimentation.

The shoe closure device 2 is positioned on the upper and outward portion of the tongue of the shoe 1, and the shape memory polymer strips 3 extend through the shoe closure device 2 and are configured to engage a shoe tongue or a shoe quarter. A shoe quarter, as used herein, is a shoe portion positioned on either side and above a tongue of the shoe; optionally the shoe quarter extends around the ankle regions of the shoe.

Figure 2:
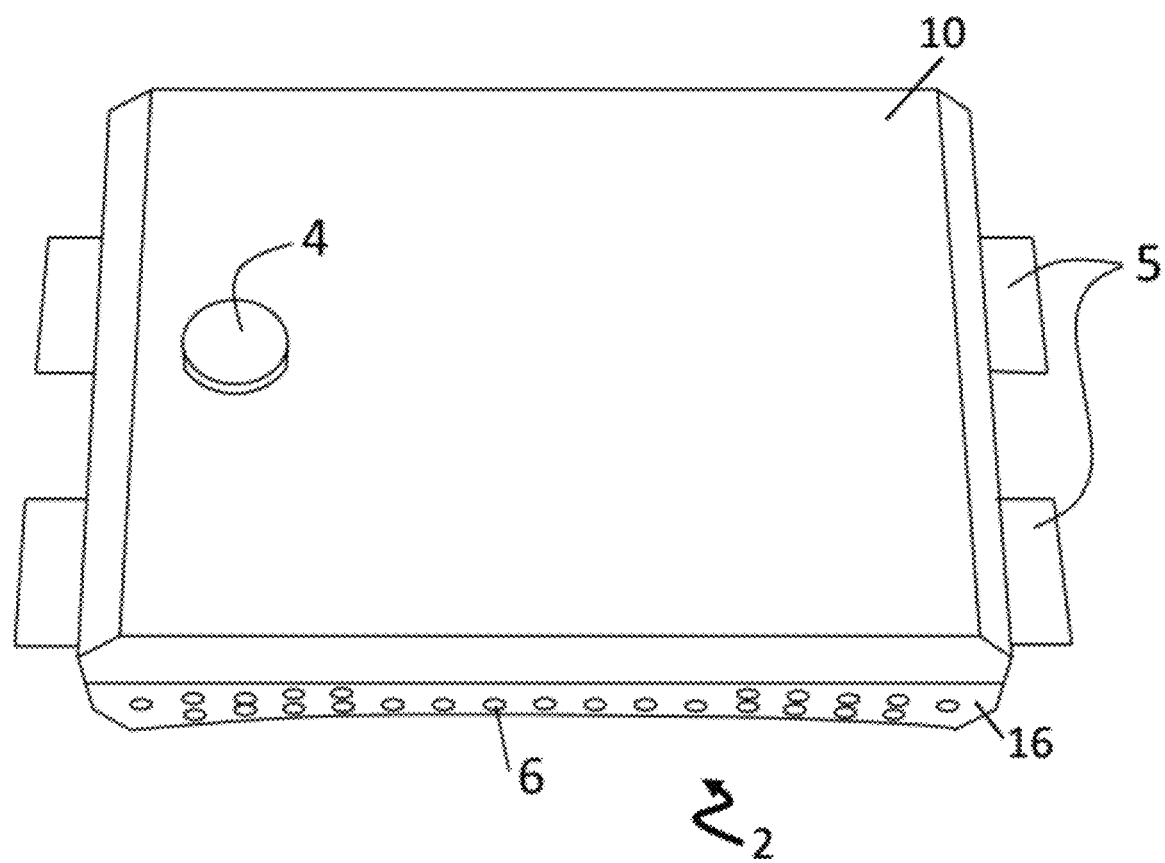
FIG. 2 depicts a top view of the shoe closure device.

An actuator is positioned such that a user may actuate the closing function of the shoe. In one aspect, the actuator may be a button 4 but it may be any use-controllable device that can communicate with a controller 12 to close the shoe. Button 4 is located on the top cover portion 10 of the shoe closure device 2, once the button 4 is pressed, two red LEDs lights on the button 4 will turn on to indicate it is powered on and the heaters 14 start to heat up. Once it reaches a static temperature, one of the LED will turn into flashing and the shape memory polymer strips 5 start to pull back into the device (FIG. 2). A plurality of holes 6 are on the front side and back side of the bottom cover portion 16 of the shoe closure device 2 for nature cooling purpose (FIG. 2).

Figure 3:
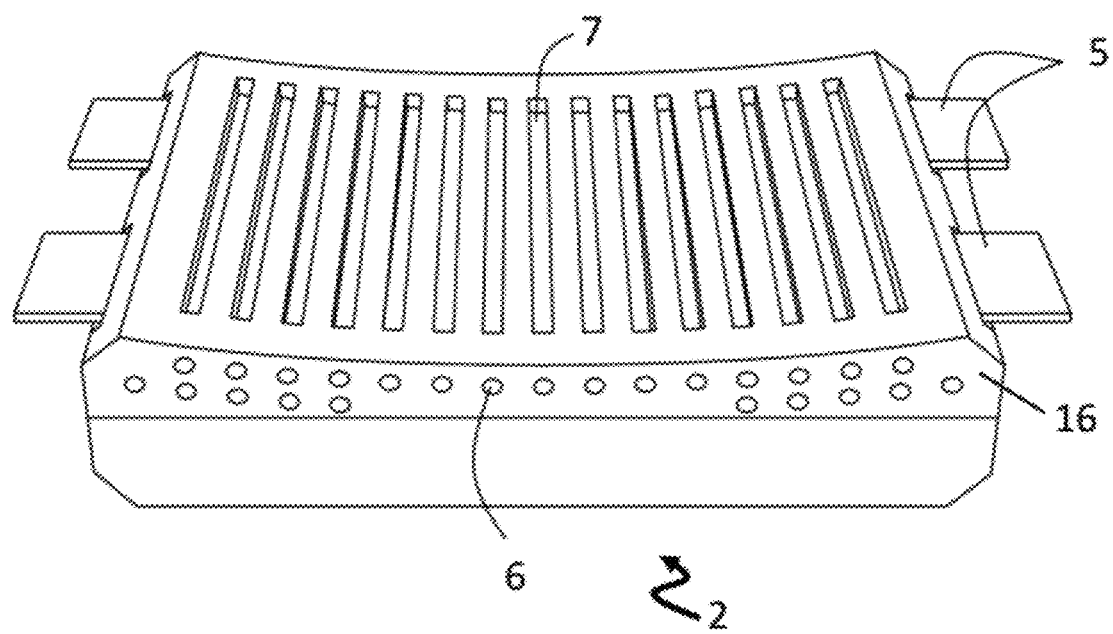
FIG. 3 depicts a bottom view of the shoe closure device.

A plurality of open slots 7 are on the bottom cover portion 16 of the shoe closure device 2 for helping speed up cooling the heaters to room temperature. The heaters 14 can be directly observed through the open slots 7 (FIG. 3).

Figure 4:
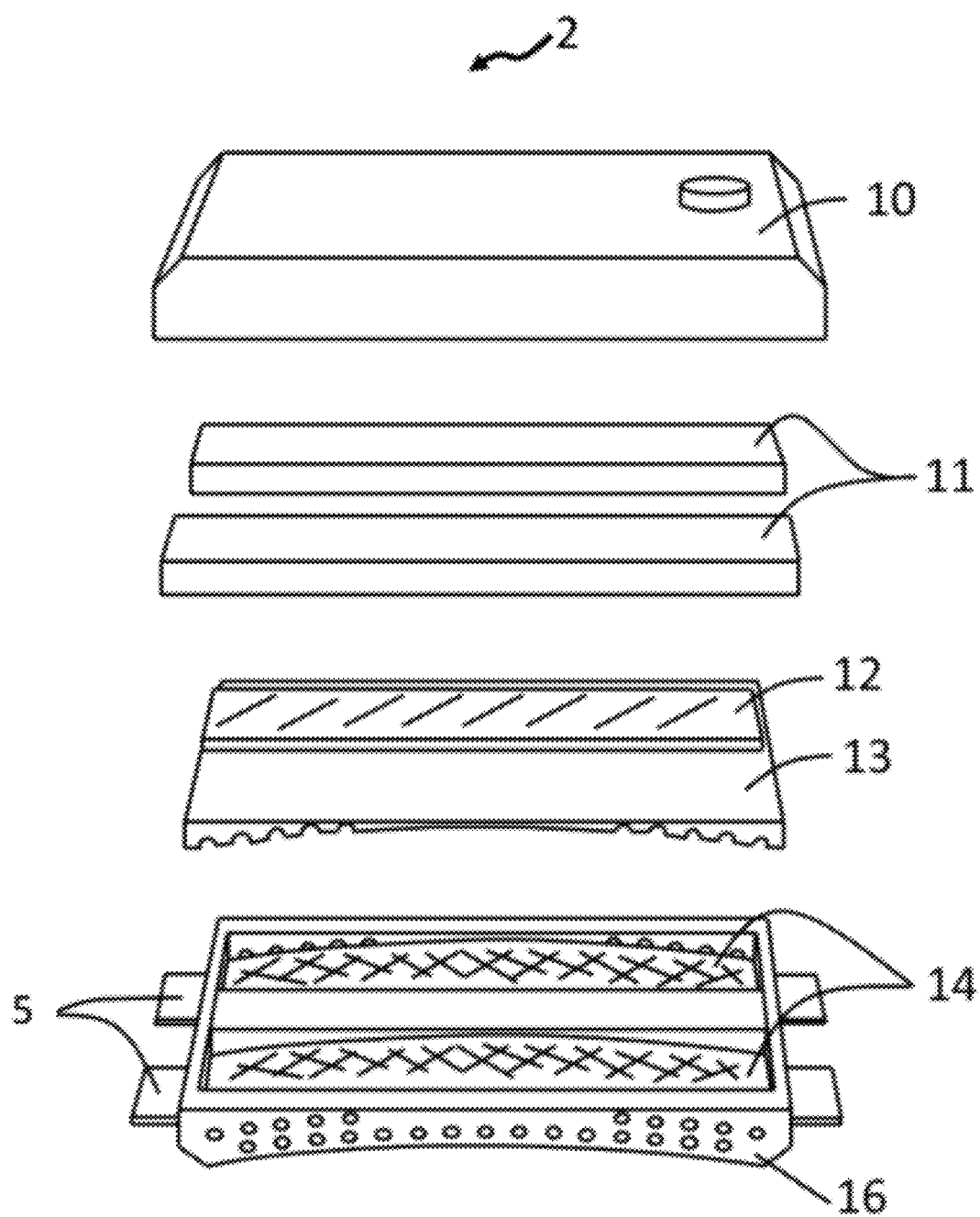
FIG. 4 depicts an inside exploded isometric view of the shoe closure device.
Figure 5:
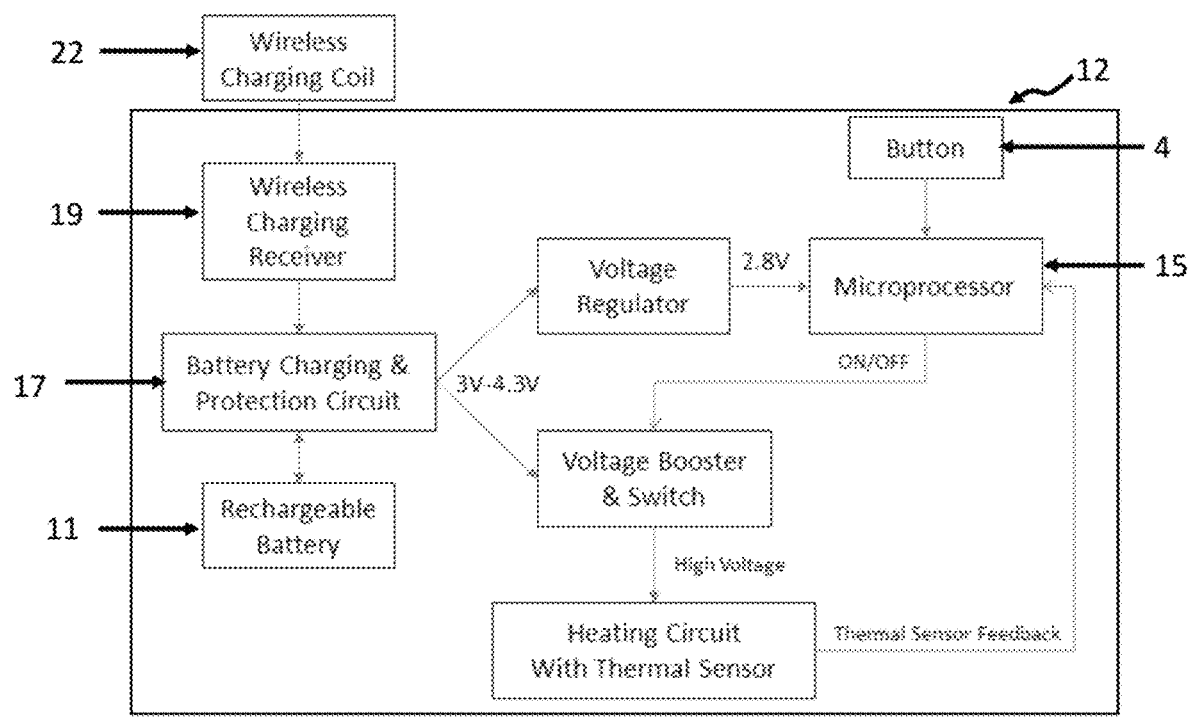
FIG. 5 depicts a schematic of a circuit of the controller.

As indicated in FIG. 4, the shoe closure device 2 comprises the top cover portion 10 and the bottom cover portion 16. An electrically-powered heater 14, which may be a flexible printed circuit (FPC) board, is used to provide heat for heating the shape memory polymer strips 5. The heat is generated by long and narrow traces on the FPC when electricity is applied. The FPC optionally includes a thermal sensor for feedback sensing and thermal control. The shape memory polymer strips 5 are positioned within two heater portions 14, details are described in FIG. 7 and FIG. 8. An inner separator 13 is positioned on the top of the heaters 14 and configured to engage the bottom cover portion 16. The inner separator 13 is used to prevent dust and water from contacting the various electric portions, protecting the battery and electronics from electrical shortage danger. A controller 12 includes a microprocessor 15, a wireless charging receiver 19, battery charging and protecting circuits 17, a voltage stepping IC 20, voltage driving circuit 21 and optional additional components not depicted (FIG. 5). A battery 11 is positioned on the top of the inner separator 13 and the controller 12. In another embodiment, the batteries are rechargeable. There may be one or more than one battery 11, it depends on the power consumption of the heaters. A greater number of batteries may assist in current discharge and increase the discharge efficiency and battery life.

Figure 6:
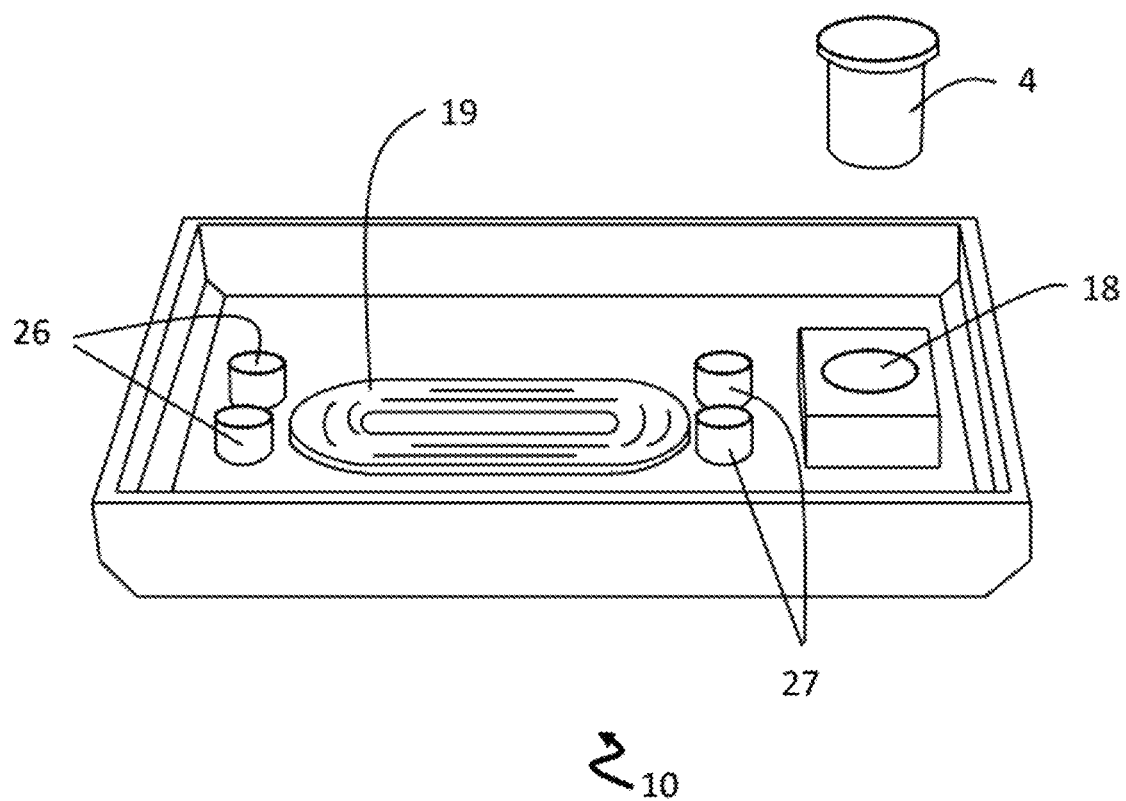
FIG. 6 depicts an exploded isometric topside view of the top cover portion of the shoe closure device.

FIG. 6 is an exploded isometric topside view of the top cover portion 10 of the shoe closure device 2. The optional button 4 is used to actuate the shore closure device 2, and start heating shape memory polymer strips 5 or to power off the shoe closure device. As illustrated, one end of the button may pass through a guide tube 18 and the other end may contact the controller 12. The wireless charging receiver 19 is used to couple energy from a wireless charging coil 22 that is placed near the wireless charging receiver coil. Magnets 26 and 27 are optional alignment magnets arranged to draw a wireless charger device near a position for charging.

Figure 7:
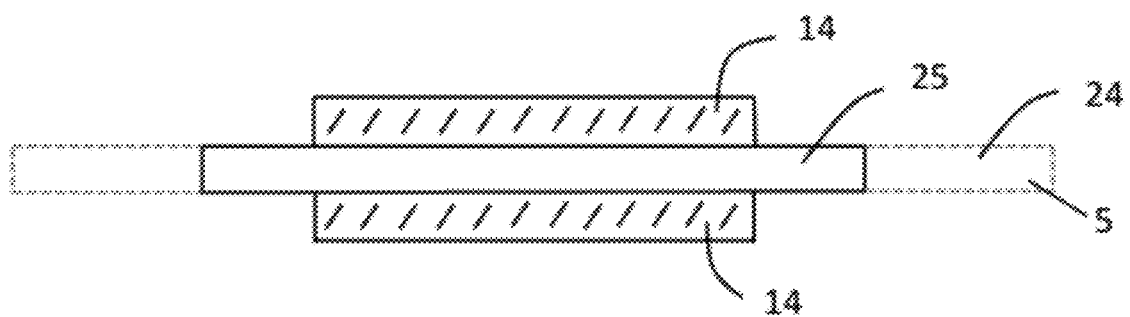
FIG. 7 depicts a side view of the heaters and shape memory polymer strips.
Figure 8:
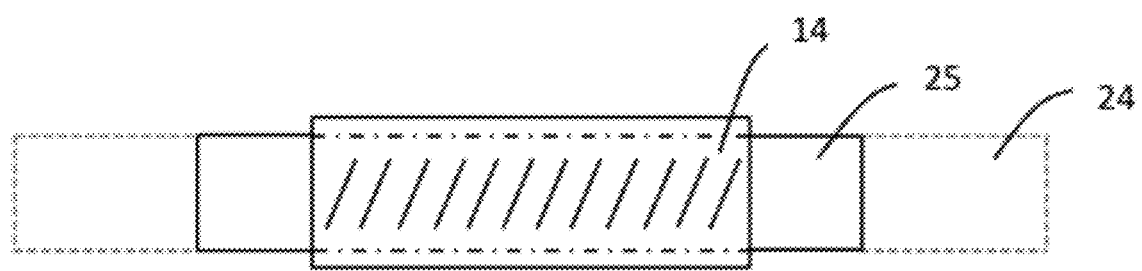
FIG. 8 depicts a top view of the heaters and shape memory polymer strips.

FIG. 7 and FIG. 8 are side view and top view of the heaters 14 and the shape memory polymer strips 5, respectively. The shape memory polymer strips 5 are positioned between heaters 14. There are two configurations of the shape memory polymer strips 5: an elongated configuration 24 corresponding to a loosened, open-shoe state and a shape-recovered configuration 25 corresponding to a tightened, closed-shoe state. The elongated configuration 24 is achieved by applying a manual tensile force on shape memory polymer strips 5 to stretch the material to its elongated length at room temperature. When heat is applied from heaters 14, the shape-recovered configuration 25 is achieved and the shape memory polymer returns to its original length, resulting in shoe closure.

Figure 9:
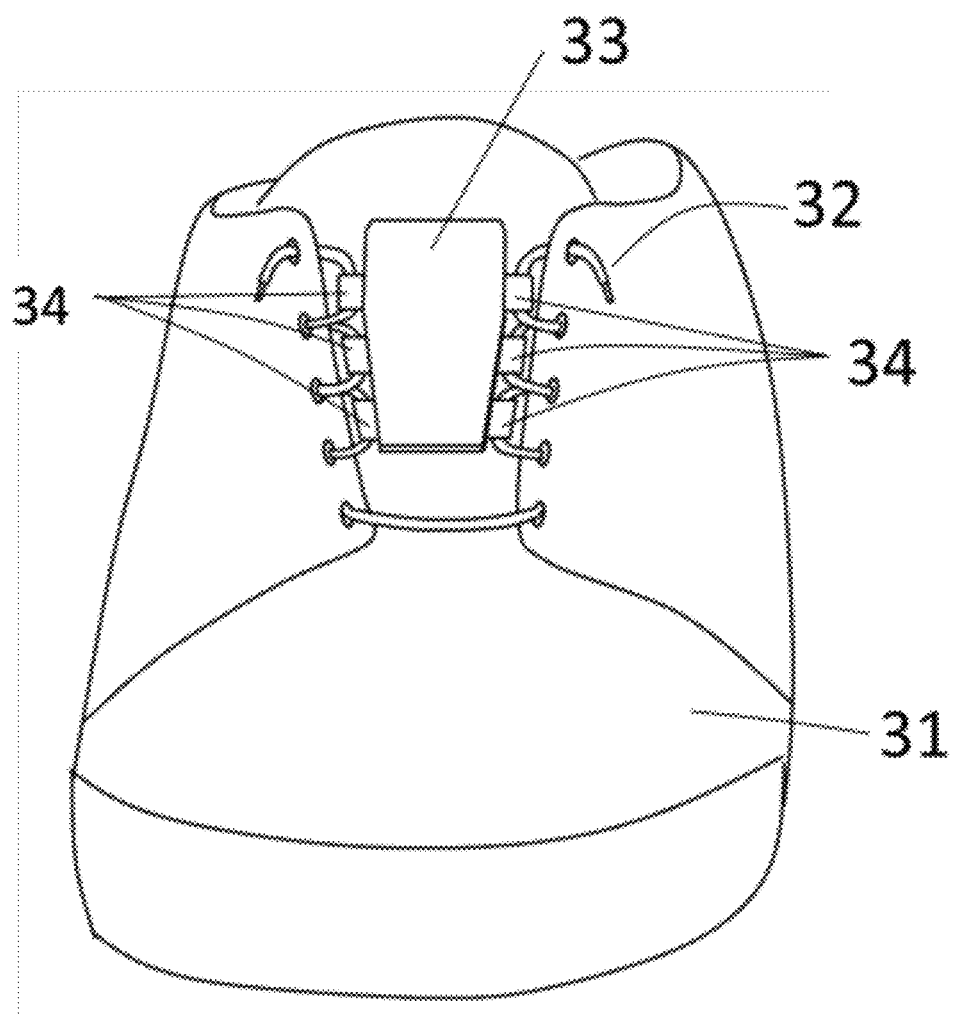
FIG. 9 depicts a perspective of a variant embodiment of a shoe equipped with the shoe closure device.

In an embodiment depicted in FIG. 9, a shoe closure device 33 is positioned on the upper and outward portion of the tongue of the shoe 31, and the shape memory polymer strips 34 extend through the shoe closure device 33 and are configured to engage the shoelace 32 or the shoe tongue.

Figure 10:
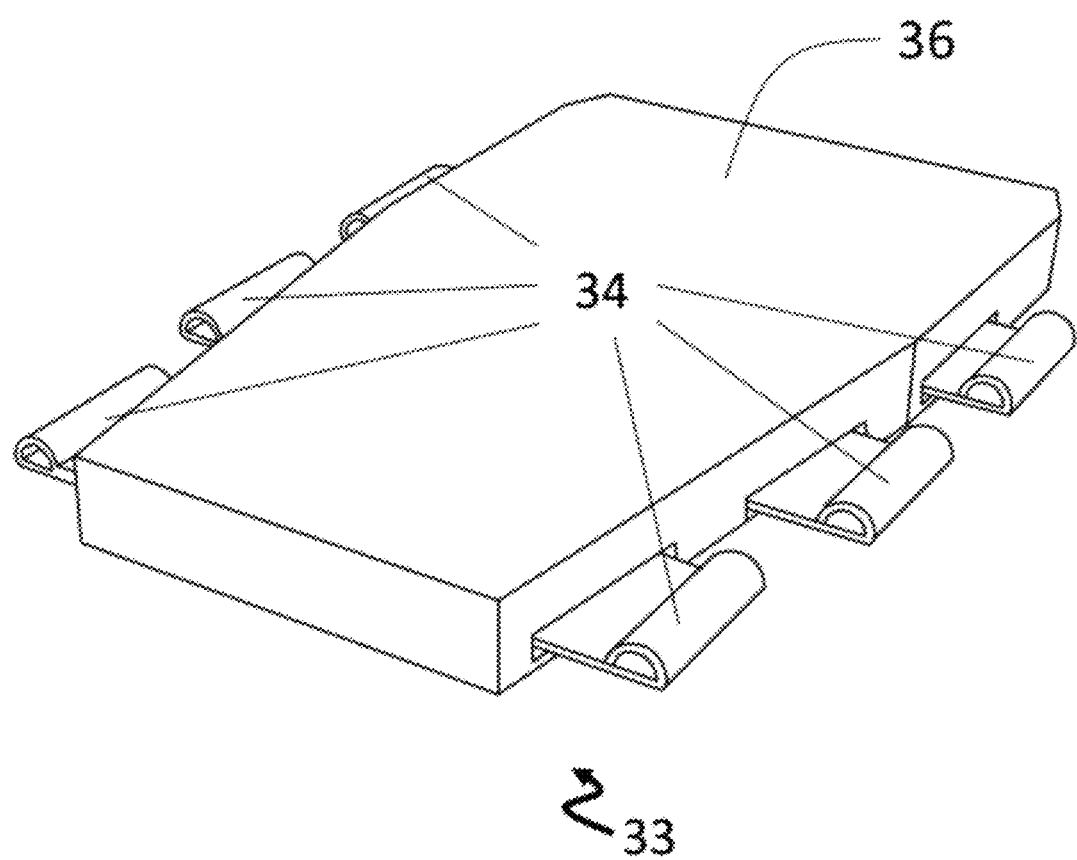
FIG. 10 depicts a top view of a variant embodiment of the shoe closure device.

An actuator, which may, for example, be a touch sensing device 36 is optionally positioned on the shoe closure device 33 (FIG. 10). Once a touch is sensed, two red LEDs light to indicate it the device is powered on and the heaters 43 and 45 begin to heat. Once a predetermined static temperature is achieved, one of the LEDs will flash and the shape memory shoe fastener 34 begins to withdraw into the device such that the shoe would be tightened by the shoelace engaged by the shape memory shoe fastener 34.

Figure 11:
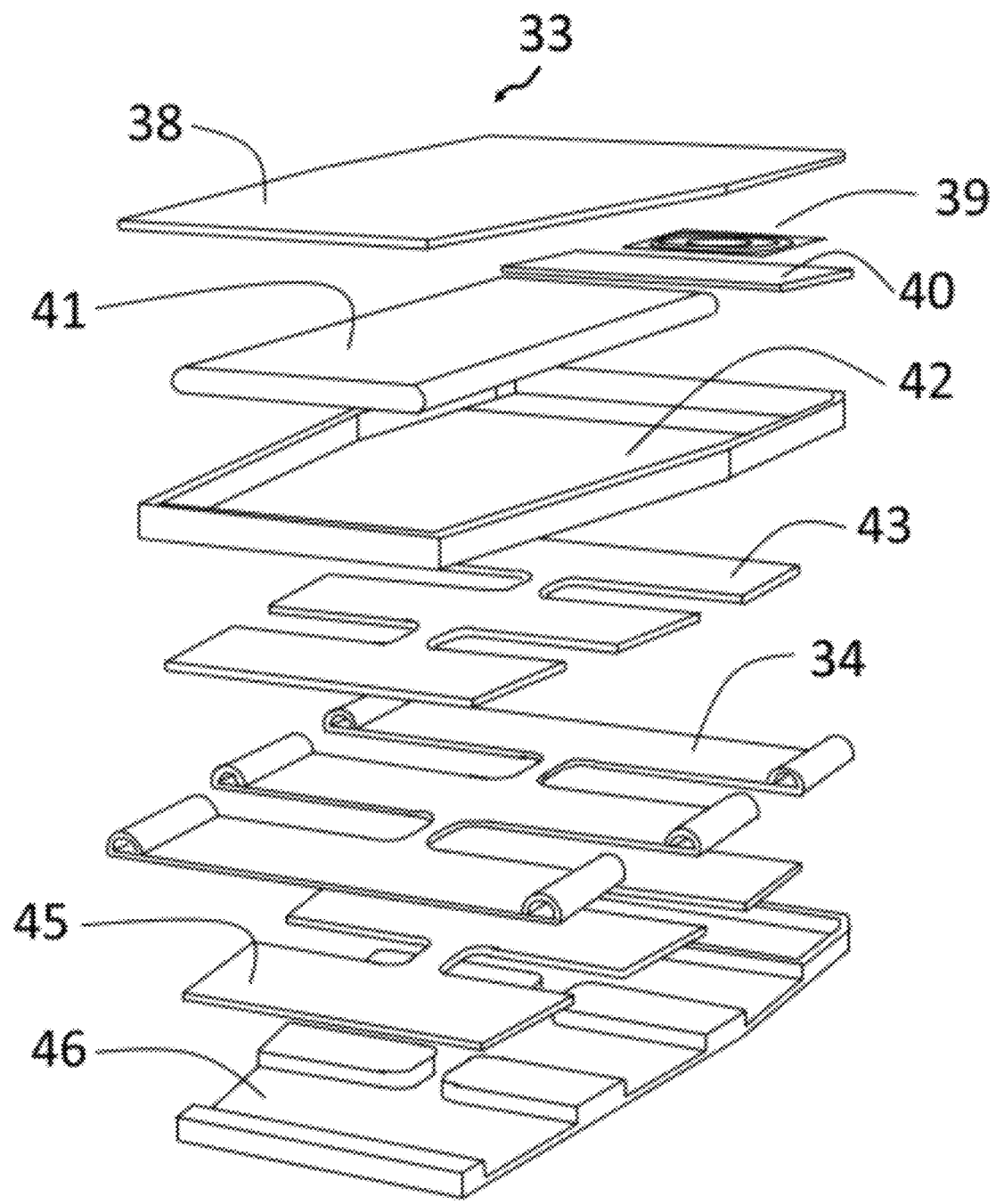
FIG. 11 depicts an inside exploded isometric view of a variant embodiment of the shoe closure device.

The shoe closure device 33 comprises a top cover portion 38, an inner separator 42, a shape memory shoe fastener 34 and a bottom cover portion 46. An inner separator 42, is positioned on the top of the heater 43 and is configured to engage the bottom cover portion 46. The inner separator 42 is used to prevent dust and water entering into the device core, protecting the battery and electronics from shortage dangers, and supporting the battery 41 and the wireless charging coil 39 (FIG. 11).

The shape memory shoe fastener 34 includes a plurality of shape memory polymer strips. At least a portion of each shape memory polymer strip is positioned within the housing and a least a portion of each shape memory polymer strip extends from the housing. The extending portion is configured to engage one or more of a shoelace, a shoe tongue, or a shoe quarter. The battery 41 is positioned on the top of the inner separator 42. There may be one or more than one battery; depending on the power consumption of the heaters, plural batteries may assist in current discharge and increase the discharge efficiency and battery life.

Figure 12:
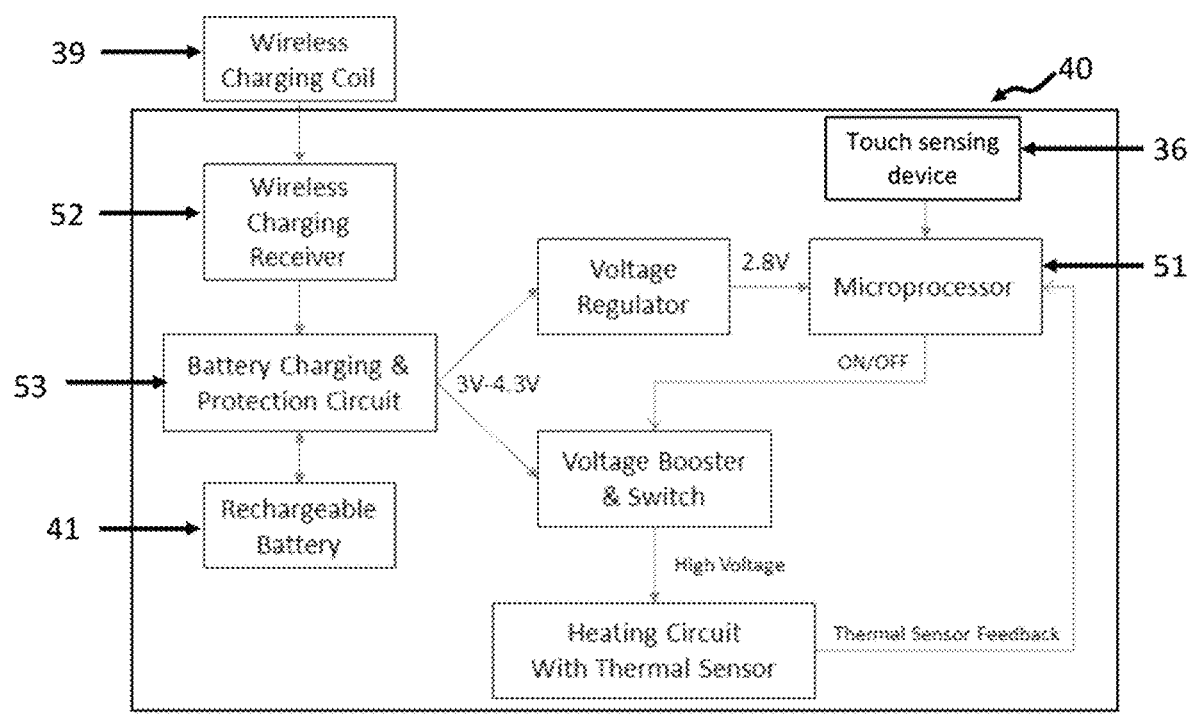
FIG. 12 depicts a schematic of a circuit of the controller.

The bottom cover portion 46 supports a controller 40, the heaters 43 and 45, and the shape memory shoe fastener 34. The controller 40 includes a microprocessor 51, a wireless charging receiver 52, battery charging and protecting circuits 53, a voltage stepping IC 54, a voltage driving circuit 55 and optional additional components not depicted (FIG. 12). The heaters 43 and 45, which may be flexible printed circuit (FPC) boards, are used to provide heat for heating the shape memory shoe fastener 34. The heat is generated by a long and narrow traces on the FPC when electricity is applied. The FPC may optionally include a thermal sensor for feedback sensing and thermal control. The shape memory shoe fastener 34 is positioned within two heater portions 43 and 45, details of which are set forth in FIG. 14 and FIG. 15.

Figure 13:
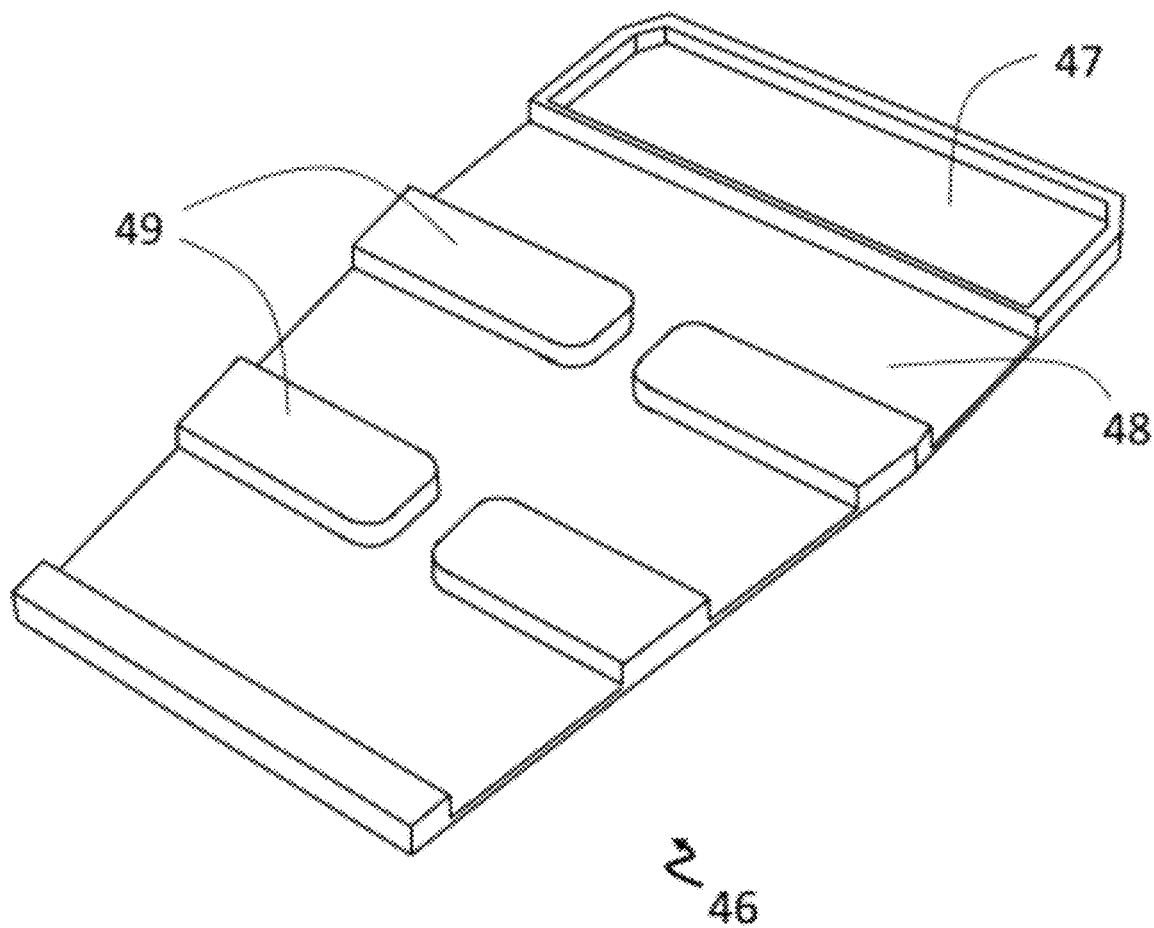
FIG. 13 depicts a top view of the bottom cover portion of the shoe closure device.

As shown in FIG. 13, the upper portion 47 of the bottom cover 46 is configured to hold the controller 40, and the lower portion 48 of the bottom cover 46 is configured to hold the heaters 45 and the shape memory shoe fastener 34. The holder 49 is positioned on the bottom cover 46 and is configured to hold the shape memory shoe fastener 34. The height of the holder 49 can be the same or a little bit higher than the thickness of the shape memory shoe fastener 34 to prevent the shape memory shoe fastener 34 from being pulled out from the bottom cover 46.

Figure 14:
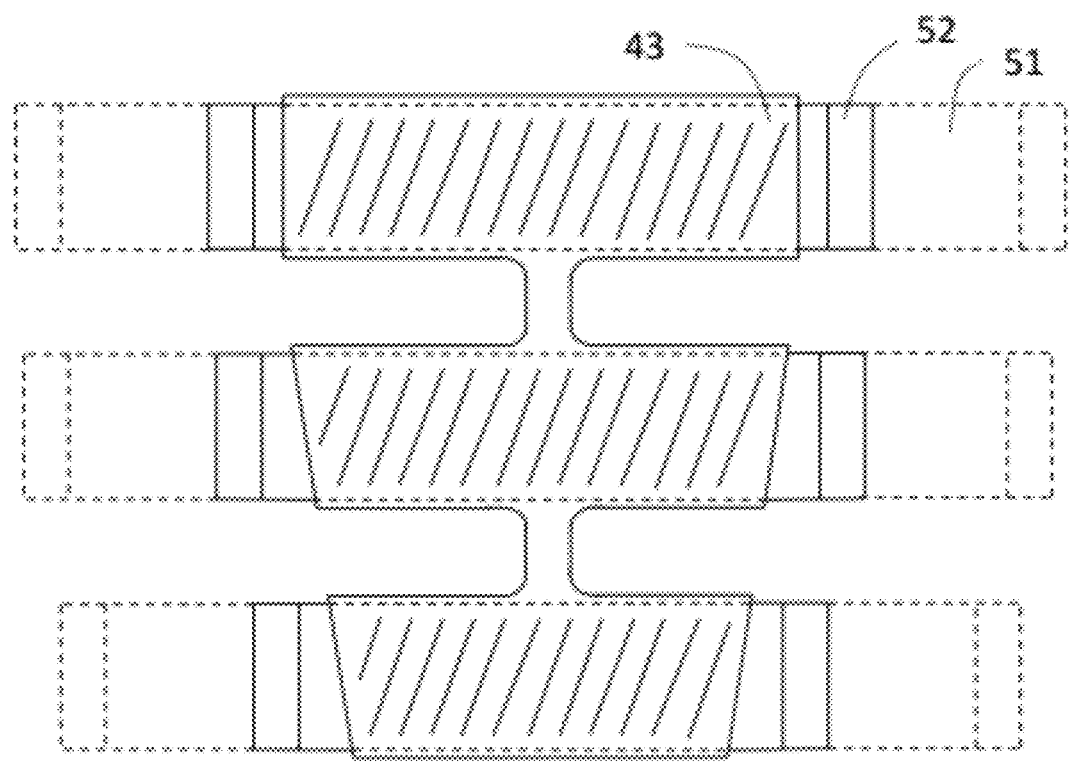
FIG. 14 depicts a top view of a variant embodiment of the heaters and shape memory polymer strips.
Figure 15:
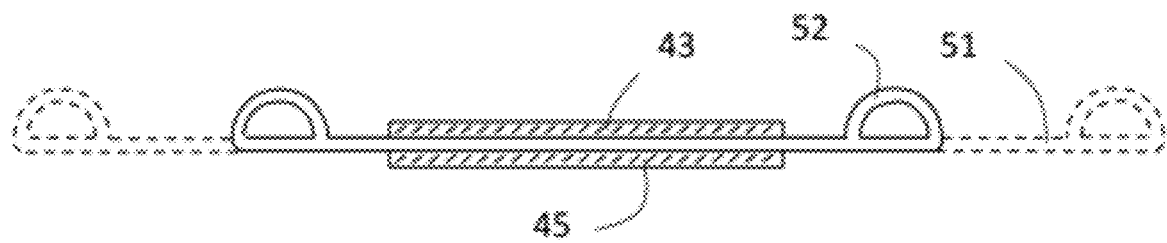
FIG. 15 depicts a side view of a variant embodiment of the heaters and shape memory polymer strips.

FIG. 14 and FIG. 15 are a side view and top view of the heaters 43, 45 and the shape memory shoe fastener 34, respectively. The shape memory shoe fastener 34 is positioned within heaters 43 and 45. There are two configurations of the shape memory shoe fastener 34: one is an elongated configuration 51 corresponding to a loosened, open-shoe state and the second is a shape-recovered configuration 52 corresponding to a tightened, closed-shoe state. The elongated configuration 51 is achieved by applying a manual tensile force to the shape memory shoe fastener 34 to stretch the polymer to an elongated length at room temperature. The second, shape-recovered configuration 52 is achieved by applying heat from heaters 43 and 45. At a temperature above the recovery temperature, the shape-memory polymer returns to its original, shape-recovered length.

Figure 16:
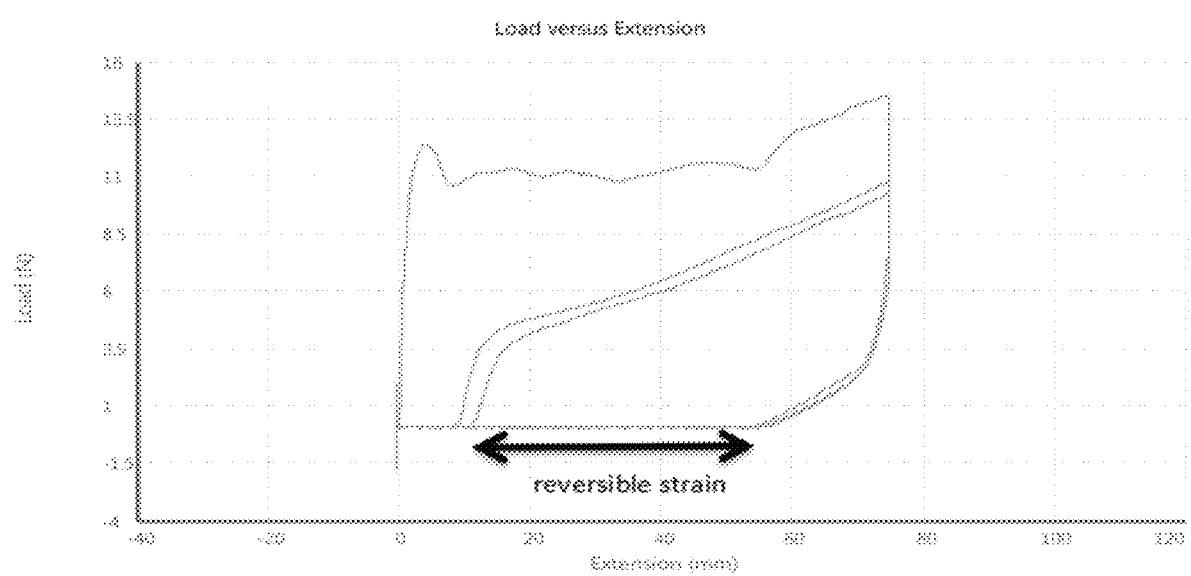
FIG. 16 depicts the stress-strain behavior during cyclic tensile.

FIG. 16 presents the stress-strain behavior of a shape-memory polymer under a cyclic tensile test, in which the reversible strain corresponds to the loosened, open-shoe state and tightened closed-shoe state. Detailed settings of the cyclic tensile test are set forth in (Zhu, Y., Hu, J., & Yeung, K. (2009), "The effect of soft segment crystallization and hard segment physical crosslinking on shape memory function in antibacterial segmented polyurethane ionomers," (Acta Biomaterialia, 5(9), 3346.), the disclosure of which is incorporated by reference herein.

Figure 17:
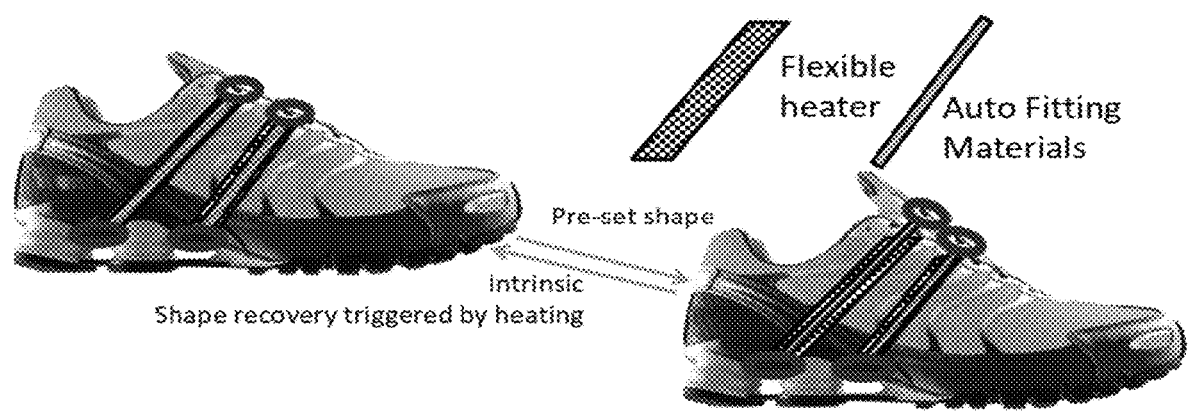
FIG. 17 depicts a variant embodiment of a shoe equipped with the shoe closure device.

Another variant of the present invention is shown in FIG. 17, in which shape memory polymer strips are fixed on shoe body or the shoe tongue. Shape recovery triggered by one or more flexible heaters provides the auto lacing function.

The invention claimed is:

1. A shoe closure device comprising:
    a housing including a top cover portion and a bottom cover portion;
    a shape memory shoe fastener, the shape memory shoe fastener comprising a plurality of shape memory polymer strips, at least a portion of each shape memory polymer strip positioned within the housing and a least a portion of each shape memory polymer strip extending from the housing; the extending portion being configured to engage one or more of a shoelace, a shoe tongue, or a shoe quarter, each of the shape memory polymer strips having an elongated configuration corresponding to a loosened, open shoe state, and a shape-recovered configuration corresponding to a tightened, closed-shoe state;
    a first electrically-powered heater positioned above the shape-memory shoe fastener;
    a second electrically-powered heater positioned beneath the shape memory shoe fastener;
    a rechargeable battery positioned within the housing and electrically communicating with each of the first and second electrically-powered heaters;
    a controller electrically communicating with the rechargeable battery and positioned within the housing, the controller including a microprocessor, a battery charging control circuit, and a wireless charging receiver, the controller configured to heat the shape memory shoe fastener to return each of the shape memory polymer strips to the shape-recovered configuration to close a shoe;
    an actuator communicating with the controller to actuate the controller to heat the shape memory shoe fastener.

2. The shoe closure device according to claim 1, wherein the shape memory shoe fastener includes a plurality of through holes configured to receive a shoelace.

3. The shoe closure device according to claim 1, wherein the housing further includes one or more cooling holes.

4. The shoe closure device according to claim 1, wherein each of the first and second electrically-powered heaters is a resistive heating element.

5. The shoe closure device according to claim 1, wherein the shape memory polymer strips are selected from one or more of shape memory polyurethane, polyester, polystylene, polynorbornene, block copolymer of polyethylene terephthalate (PET) and polyethyleneoxide (PEO), block copolymers containing polystyrene and poly(1,4-butadiene).

6. The shoe closure device according to claim 1, further comprising one or more aligning elements positioned adjacent to the wireless charging receiver.

7. The shoe closure device according to claim 1, wherein the shape memory polymer strips having either a melting point or a glass transition temperature in a range between approximately 20 degrees C. to approximately 80 degrees C.

8. The shoe closure device according to claim 1, further comprising a thermal sensor communicating with the controller for providing temperature feedback to the controller.

9. The shoe closure device according to claim 1, wherein the controller further comprises a voltage stepping integrated circuit.

10. The shoe closure device according to claim 1, further comprising a separator positioned between the first electrically-controlled heater and the controller.

* * * * *